(12) United States Patent
Moreland, IV et al.

(10) Patent No.: US 10,818,450 B2
(45) Date of Patent: Oct. 27, 2020

(54) PADDLE SWITCH

(71) Applicant: Black & Decker Inc., New Britain, CT (US)

(72) Inventors: Floyd E. Moreland, IV, York, PA (US); Earnest N. Copeland, Jr., Perry Hall, MD (US); James H. Stiles, III, Baltimore, MD (US); Daniel F. Nace, Towson, MD (US); Kyle J. Christophersen, Lutherville-Timonium, MD (US)

(73) Assignee: Black & Decker Inc., New Britain, CT (US)

( * ) Notice: Subject to any disclaimer, the term of this patent is extended or adjusted under 35 U.S.C. 154(b) by 584 days.

(21) Appl. No.: 15/622,808

(22) Filed: Jun. 14, 2017

(65) Prior Publication Data

US 2018/0366286 A1 Dec. 20, 2018

(51) Int. Cl.

| | |
|---|---|
| *H01H 21/22* | (2006.01) |
| *B25F 5/00* | (2006.01) |
| *B24B 23/02* | (2006.01) |
| *B25F 5/02* | (2006.01) |
| *H01H 21/10* | (2006.01) |
| *H02K 7/14* | (2006.01) |
| *H02P 6/00* | (2016.01) |
| *H05K 5/00* | (2006.01) |

(52) U.S. Cl.
CPC ........... *H01H 21/22* (2013.01); *B24B 23/028* (2013.01); *B25F 5/00* (2013.01); *B25F 5/02* (2013.01); *H01H 21/10* (2013.01); *H02K 7/145* (2013.01); *H02P 6/00* (2013.01); *H05K 5/0017* (2013.01); *H01H 2235/01* (2013.01)

(58) Field of Classification Search
CPC .... H01H 21/22; H01H 21/10; H01H 2235/01; B25F 5/00; B25F 5/02; H05K 5/0017; H02P 6/00; H02K 7/145; B24B 23/028
USPC ................ 200/329–332.2, 522, 43.17, 61.85
See application file for complete search history.

(56) References Cited

U.S. PATENT DOCUMENTS

| | | |
|---|---|---|
| 394,417 A | 12/1888 | Van Depoele |
| 731,740 A | 6/1903 | Bassett |
| 1,971,790 A | 8/1934 | Mall |
| | (Continued) | |

FOREIGN PATENT DOCUMENTS

| | | |
|---|---|---|
| DE | 118 339 | 3/1900 |
| DE | 122 029 | 11/1900 |
| | (Continued) | |

OTHER PUBLICATIONS

Kress Elektrowerkzeuge Brochure, Program 2002/2003, p. 21.

*Primary Examiner* — Edwin A. Leon
*Assistant Examiner* — Lheiren Mae A Caroc
(74) *Attorney, Agent, or Firm* — Amir Rohani (57) ABSTRACT

A power tool is provided including a housing, a motor disposed within the housing, an on/off switch having a contact tip disposed within the housing for activating the motor, a paddle switch coupled to the housing via a pivot member and having a paddle trigger engageable by a user, a switch contact lever disposed in selectable engagement with the contact tip of the on/off switch to activate or deactivate the on/off switch, and a biasing member disposed between the switch contact lever and the paddle switch to absorb a travel distance of the paddle trigger with respect to the switch contact lever.

20 Claims, 8 Drawing Sheets

(56) References Cited

U.S. PATENT DOCUMENTS

| | | |
|---|---|---|
| 2,079,143 A | 5/1937 | Albertson |
| 2,192,845 A | 3/1940 | Bean |
| 2,201,420 A | 5/1940 | Zchau |
| 2,348,341 A | 5/1944 | Gough |
| 2,905,266 A | 9/1959 | Poch |
| 2,987,636 A | 6/1961 | Jepson |
| 3,077,340 A | 2/1963 | Jepson et al. |
| 3,266,535 A | 8/1966 | Brodie |
| 3,305,281 A | 2/1967 | Janis |
| 3,325,948 A | 6/1967 | Gronke |
| 3,474,575 A | 10/1969 | Beckering et al. |
| 3,530,337 A | 9/1970 | Moore |
| 3,535,829 A | 10/1970 | Dudek |
| 3,681,635 A | 5/1972 | Bayer |
| 3,731,556 A | 5/1973 | Decker |
| 3,760,570 A | 9/1973 | Ehrlich et al. |
| 3,797,336 A | 3/1974 | Howe |
| 3,817,115 A | 6/1974 | Schnizler et al. |
| 3,824,745 A | 7/1974 | Hutchins |
| 3,847,233 A | 11/1974 | Glover et al. |
| 3,854,020 A | 12/1974 | Summa et al. |
| 3,872,951 A | 3/1975 | Hastings, Jr. |
| 3,873,796 A | 3/1975 | Worobec, Jr. et al. |
| 3,899,852 A | 8/1975 | Batson |
| 3,961,433 A | 6/1976 | D'Cruz et al. |
| 3,999,176 A | 12/1976 | Kellogg et al. |
| 4,007,401 A | 2/1977 | Kimmel et al. |
| 4,020,359 A | 4/1977 | Tate et al. |
| 4,137,749 A | 2/1979 | Friedrich |
| 4,145,848 A | 3/1979 | Hutchins |
| 4,157,483 A | 6/1979 | Frimley |
| 4,186,288 A | 1/1980 | Overton et al. |
| 4,205,732 A | 6/1980 | Auerbach et al. |
| 4,232,414 A | 11/1980 | Curtiss |
| 4,250,587 A | 2/1981 | Beck, Jr. |
| 4,278,371 A | 7/1981 | Meyer |
| 4,280,026 A | 7/1981 | Alessio |
| 4,295,295 A | 10/1981 | Brand et al. |
| 4,334,332 A | 6/1982 | Downs |
| 4,343,502 A | 8/1982 | Nelson |
| 4,380,693 A | 4/1983 | Kuhlmann et al. |
| 4,400,995 A | 8/1983 | Palm |
| 4,428,120 A | 1/1984 | Kobayashi et al. |
| 4,434,586 A | 3/1984 | Muller et al. |
| 4,467,896 A | 5/1984 | Sauerwein et al. |
| 4,476,602 A | 11/1984 | Hum et al. |
| 4,506,119 A | 3/1985 | Tanabe |
| 4,536,670 A | 8/1985 | Mayer |
| 4,595,851 A | 6/1986 | Houben et al. |
| 4,604,538 A | 8/1986 | Merrill et al. |
| 4,658,321 A | 4/1987 | Lindner |
| 4,729,252 A | 3/1988 | Huber et al. |
| 4,735,020 A | 4/1988 | Schulz et al. |
| 4,742,257 A | 5/1988 | Carpenter |
| 4,765,099 A | 8/1988 | Tanner et al. |
| 4,770,316 A | 9/1988 | Overy |
| 4,779,382 A | 10/1988 | Rudolf et al. |
| 4,791,331 A | 12/1988 | Girardin |
| 4,876,797 A | 10/1989 | Zapata |
| 4,879,438 A | 11/1989 | Winchester |
| 4,905,420 A | 3/1990 | Flachenecker et al. |
| 4,932,163 A | 6/1990 | Chilton et al. |
| 4,955,744 A | 9/1990 | Barth et al. |
| 4,967,516 A | 11/1990 | Hoshino et al. |
| 4,976,071 A | 12/1990 | Stabler |
| 4,989,374 A | 2/1991 | Rudolf et al. |
| 5,015,896 A | 5/1991 | Wong |
| 5,022,188 A | 6/1991 | Borst |
| 5,028,826 A | 7/1991 | Kitamura |
| 5,038,523 A | 8/1991 | Farber et al. |
| 5,051,552 A | 9/1991 | Hou et al. |
| 5,058,909 A | 10/1991 | Rudolf et al. |
| 5,077,942 A | 1/1992 | Jacobsson |
| 5,100,275 A | 3/1992 | Schirrmacher |
| 5,105,130 A | 4/1992 | Barker et al. |
| 5,114,317 A | 5/1992 | Cohen |
| 5,114,351 A | 5/1992 | Hoffmann |
| 5,157,873 A | 10/1992 | Rudolf et al. |
| 5,161,334 A | 11/1992 | Schaal et al. |
| 5,170,851 A | 12/1992 | Kress et al. |
| 5,184,039 A | 2/1993 | Kraft |
| 5,207,028 A | 5/1993 | Timmons |
| 5,218,790 A | 6/1993 | Huang |
| 5,227,950 A | 7/1993 | Twerdochlib |
| 5,263,283 A | 11/1993 | Rudolf et al. |
| 5,293,156 A | 3/1994 | Shoji et al. |
| 5,315,193 A | 5/1994 | Kummer et al. |
| 5,317,838 A | 6/1994 | Boumer |
| 5,357,179 A | 10/1994 | Abbagnaro et al. |
| 5,425,666 A | 6/1995 | Frank et al. |
| 5,428,197 A | 6/1995 | McCurry et al. |
| 5,437,173 A | 8/1995 | Spinar |
| 5,453,040 A | 9/1995 | Schaal et al. |
| 5,464,365 A | 11/1995 | Kim |
| 5,477,845 A | 12/1995 | Zuzelo |
| 5,494,368 A | 2/1996 | Matthews |
| 5,542,380 A | 8/1996 | Chatten |
| 5,545,078 A | 8/1996 | Schulz et al. |
| 5,558,210 A | 9/1996 | Jonischus |
| 5,558,571 A | 9/1996 | Toyoshima et al. |
| 5,563,461 A | 10/1996 | Daniels |
| 5,564,969 A | 10/1996 | Tsang |
| 5,570,776 A | 11/1996 | Buchholz et al. |
| 5,577,600 A | 11/1996 | Schoene et al. |
| 5,580,302 A | 12/1996 | Howard et al. |
| 5,581,891 A | 12/1996 | Wheeler et al. |
| 5,584,753 A | 12/1996 | Takahashi |
| 5,601,483 A | 2/1997 | Rudolf et al. |
| 5,634,274 A | 6/1997 | Ohkouchi et al. |
| 5,637,035 A | 6/1997 | Yee |
| 5,638,945 A | 6/1997 | Fukinuki et al. |
| 5,667,347 A | 9/1997 | Matthews |
| 5,679,066 A | 10/1997 | Butz et al. |
| 5,718,621 A | 2/1998 | Turley |
| 5,707,275 A | 6/1998 | Preis et al. |
| 5,780,952 A | 7/1998 | Lau |
| 5,793,141 A | 8/1998 | Simonsen et al. |
| 5,819,871 A | 10/1998 | Takaoka |
| 5,839,950 A | 11/1998 | Johansson et al. |
| 5,947,805 A | 9/1999 | Van Osenhruggen |
| 5,969,312 A | 10/1999 | Svetilik et al. |
| 5,979,000 A | 11/1999 | Gansow |
| 6,031,194 A | 2/2000 | Aoki |
| 6,031,313 A | 2/2000 | Sugai et al. |
| 6,058,815 A | 5/2000 | Habermehl |
| 6,087,754 A | 7/2000 | Berger |
| 6,119,547 A | 9/2000 | Goransson et al. |
| 6,120,262 A | 9/2000 | Etter et al. |
| 6,120,362 A | 9/2000 | Etter et al. |
| 6,139,411 A | 10/2000 | Everts et al. |
| 6,159,085 A | 12/2000 | Hara |
| 6,175,179 B1 | 1/2001 | Herve |
| 6,236,177 B1 | 5/2001 | Zack et al. |
| 6,241,594 B1 | 6/2001 | Lepold |
| 6,244,943 B1 | 6/2001 | Bohler et al. |
| 6,257,970 B1 | 7/2001 | Huber |
| 6,227,013 B1 | 8/2001 | Sasaki et al. |
| 6,277,013 B1 | 8/2001 | Sasaki et al. |
| 6,296,427 B1 | 10/2001 | Potter et al. |
| 6,367,618 B1 | 4/2002 | Szuba |
| 6,386,961 B1 | 5/2002 | Cureton |
| 6,415,875 B1 | 7/2002 | Meixner et al. |
| 6,441,533 B1 | 8/2002 | Grosskopf et al. |
| 6,454,639 B1 | 9/2002 | Huber |
| 6,464,572 B2 | 11/2002 | Jansson |
| D468,179 S | 1/2003 | Hayakawa et al. |
| 6,511,369 B2 | 1/2003 | Chi |
| 6,514,131 B1 | 2/2003 | Reich et al. |
| 6,515,399 B1 | 2/2003 | Lauf et al. |
| 6,527,630 B2 | 3/2003 | Mannsperger et al. |
| 6,554,554 B1 | 4/2003 | Matthews |
| 6,569,001 B2 | 5/2003 | Rudolf et al. |
| 6,585,834 B1 | 7/2003 | Kapaan et al. |
| 6,595,196 B2 | 7/2003 | Bath |

(56) References Cited

U.S. PATENT DOCUMENTS

| | | | |
|---|---|---|---|
| 6,598,724 B1 | 7/2003 | Stedman et al. | |
| 6,602,122 B1 | 8/2003 | Rudolf et al. | |
| D479,452 S | 9/2003 | Cho | |
| D479,969 S | 9/2003 | Robson et al. | |
| 6,669,542 B1 | 12/2003 | Walz et al. | |
| 6,702,473 B2 | 3/2004 | Kahlman et al. | |
| 6,715,380 B2 | 4/2004 | Listl et al. | |
| 6,734,584 B1 | 5/2004 | Browne et al. | |
| D491,033 S | 6/2004 | Bian | |
| 6,742,601 B2 | 6/2004 | Numata | |
| 6,753,490 B2 | 6/2004 | Svetlik et al. | |
| 6,787,721 B1 | 9/2004 | Huang | |
| 6,805,208 B2 | 10/2004 | Kusmierski et al. | |
| 6,896,604 B1 | 5/2005 | Taylor et al. | |
| 7,204,744 B2 | 4/2007 | Lamprecht et al. | |
| 7,252,581 B2 | 8/2007 | Numata et al. | |
| 7,270,641 B2 | 9/2007 | Glucksman et al. | |
| 7,428,881 B2 | 9/2008 | Drelinger | |
| 7,541,701 B2 | 6/2009 | Lin et al. | |
| 8,666,493 B2 | 3/2014 | Schleicher et al. | |
| 2001/0008098 A1 | 7/2001 | Dibbern | |
| 2002/0045415 A1 | 4/2002 | Bath | |
| 2002/0056338 A1 | 5/2002 | Olausson et al. | |
| 2002/0090885 A1 | 7/2002 | Wendt | |
| 2002/0163280 A1 | 11/2002 | Nakajima et al. | |
| 2003/0000716 A1 | 1/2003 | Hofmann et al. | |
| 2003/0000717 A1 | 1/2003 | Hofmann et al. | |
| 2003/0136010 A1 | 7/2003 | Childs et al. | |
| 2003/0147719 A1 | 8/2003 | Manfred | |
| 2003/0190877 A1 | 10/2003 | Gallagher et al. | |
| 2004/0020670 A1 | 2/2004 | Kusmierski et al. | |
| 2004/0069513 A1 | 4/2004 | Wolf et al. | |
| 2005/0146206 A1 | 7/2005 | Moreau et al. | |
| 2005/0152759 A1 | 7/2005 | Allemann et al. | |
| 2005/0153636 A1 | 7/2005 | Numata | |
| 2005/0200087 A1 | 9/2005 | Vasueva et al. | |
| 2015/0279592 A1* | 10/2015 | Ekstrom | B23Q 5/041 200/522 |

FOREIGN PATENT DOCUMENTS

| | | |
|---|---|---|
| DE | 123 407 | 2/1901 |
| DE | 131 551 | 5/1901 |
| DE | 155 280 | 12/1903 |
| DE | 178 451 | 2/1906 |
| DE | 225 343 | 3/1909 |
| DE | 311 993 | 3/1918 |
| DE | 341 238 | 9/1919 |
| DE | 429619 | 8/1920 |
| DE | 482 136 | 8/1929 |
| DE | 736 475 | 6/1943 |
| DE | 881 831 C | 10/1952 |
| DE | 923 803 | 6/1954 |
| DE | 944 976 | 1/1956 |
| DE | 1 719 274 | 3/1956 |
| DE | 1 006 950 | 4/1957 |
| DE | 1 007 870 | 5/1957 |
| DE | 1 030 443 | 5/1958 |
| DE | 1 046 169 | 12/1958 |
| DE | 1 073 606 | 1/1960 |
| DE | 1 110 740 | 7/1961 |
| DE | 1 843 271 | 12/1961 |
| DE | 1 867 318 | 2/1963 |
| DE | 1 154 863 | 9/1963 |
| DE | 1 195 859 | 7/1965 |
| DE | 1 929 390 | 12/1965 |
| DE | 1 932 292 | 2/1966 |
| DE | 1 952 876 | 1/1967 |
| DE | 70 31 833 U | 4/1971 |
| DE | P 20 37 993.5 | 5/1971 |
| DE | 1 763 401 A | 8/1971 |
| DE | 1763649 | 11/1971 |
| DE | 20 39 793 | 2/1972 |
| DE | P21 47 927.6 | 3/1973 |
| DE | 21 56 770 | 5/1973 |
| DE | P 21 58 598.8 | 6/1973 |
| DE | 2201297 | 7/1973 |
| DE | P 23 16 323 | 10/1974 |
| DE | 77 09 148 | 7/1977 |
| DE | 26 26 003 C2 | 12/1977 |
| DE | 26 44 118 A1 | 2/1978 |
| DE | 78 02 306 | 5/1978 |
| DE | 28 50 120 C2 | 5/1979 |
| DE | 29 19 669 | 5/1979 |
| DE | 2850120 | 5/1979 |
| DE | 28 43 712 | 7/1979 |
| DE | 77 28 401 | 7/1979 |
| DE | 80 16 761.9 | 5/1980 |
| DE | 29 27 331 | 2/1981 |
| DE | 2944750 | 5/1981 |
| DE | 3001907 | 7/1981 |
| DE | 30 23 691 C2 | 1/1982 |
| DE | 30 31 915 A1 | 4/1982 |
| DE | 31 10 912 A1 | 9/1982 |
| DE | 82 14 078 | 10/1982 |
| DE | 31 18 831 A1 | 1/1983 |
| DE | 32 34 254 A1 | 4/1983 |
| DE | 32 36 713 C2 | 5/1983 |
| DE | 83 27 966 U1 | 1/1984 |
| DE | 33 29 632 | 2/1984 |
| DE | 33 30 110 C2 | 3/1984 |
| DE | 33 41 874 C1 | 7/1984 |
| DE | 33 17 425 A1 | 8/1984 |
| DE | 83 17 913.5 U1 | 11/1984 |
| DE | 84 27 601 U1 | 5/1985 |
| DE | 35 34 052 | 4/1986 |
| DE | 35 01 947 | 7/1986 |
| DE | 36 04 980 | 8/1986 |
| DE | 85 25 046 U1 | 8/1986 |
| DE | 35 12 365 C2 | 10/1986 |
| DE | 35 31 309 A1 | 3/1987 |
| DE | 86 32 779 U1 | 3/1987 |
| DE | 36 41 878 A1 | 6/1987 |
| DE | 35 46 394 A1 | 7/1987 |
| DE | 86 01 684 U1 | 7/1987 |
| DE | 87 05 640 | 10/1987 |
| DE | 36 38 952 C2 | 5/1988 |
| DE | 88 09 302 U1 | 12/1988 |
| DE | 37 22 629 C2 | 1/1989 |
| DE | 37 41 536 A1 | 6/1989 |
| DE | 88 11 964 U1 | 8/1989 |
| DE | 88 12 072 U1 | 8/1989 |
| DE | 38 28 954 C2 | 3/1990 |
| DE | 38 44 617 A1 | 3/1990 |
| DE | 89 05 006 U1 | 3/1990 |
| DE | 38 36 317 A1 | 4/1990 |
| DE | 89 10 426 U1 | 8/1990 |
| DE | 39 22 514 A1 | 1/1991 |
| DE | 40 04 464 C2 | 1/1991 |
| DE | 40 08 161 C1 | 5/1991 |
| DE | 41 07 431 C2 | 9/1991 |
| DE | 41 02 014 | 10/1991 |
| DE | 91 04 028 U1 | 11/1991 |
| DE | G 91 16 586.5 | 11/1991 |
| DE | 41 05 340 C2 | 8/1992 |
| DE | 41 19 325 A1 | 12/1992 |
| DE | 41 19 941 A1 | 1/1993 |
| DE | 92 13 624 | 1/1993 |
| DE | 91 12 104 UI | 3/1993 |
| DE | 91 16 586 | 8/1993 |
| DE | 92 08 940 | 12/1993 |
| DE | 43 34 358 A1 | 4/1994 |
| DE | 43 05 317 C2 | 9/1994 |
| DE | 43 06 009 C2 | 9/1994 |
| DE | 44 21 480 A1 | 3/1995 |
| DE | 43 37 023 A1 | 5/1995 |
| DE | 44 38 549 A1 | 5/1995 |
| DE | 43 41 931 A1 | 6/1995 |
| DE | 295 14 330 U1 | 12/1995 |
| DE | 44 24 427 C2 | 1/1996 |
| DE | 44 32 973 A1 | 3/1996 |
| DE | 296 05 144 U1 | 8/1996 |
| DE | 195 07 955 A1 | 9/1996 |

(56) References Cited

FOREIGN PATENT DOCUMENTS

| | | |
|---|---|---|
| DE | 195 10 291 C2 | 9/1996 |
| DE | 296 12 231 | 10/1996 |
| DE | 196 18 958 A1 | 1/1997 |
| DE | 195 30 542 A1 | 2/1997 |
| DE | 296 22 019 U1 | 5/1998 |
| DE | 196 50 224 A1 | 6/1998 |
| DE | 196 50 364 A1 | 6/1998 |
| DE | 297 02 947 U1 | 7/1998 |
| DE | 19800047 | 9/1998 |
| DE | 197 50 038 A1 | 5/1999 |
| DE | 198 07 439 A1 | 8/1999 |
| DE | 298 16 970 U1 | 2/2000 |
| DE | 298 21 418 | 4/2000 |
| DE | 198 60 396 A1 | 6/2000 |
| DE | 199 32 578 A1 | 6/2000 |
| DE | 199 04 728 A1 | 8/2000 |
| DE | 199 14 855 A1 | 10/2000 |
| DE | 100 35 219.7 | 1/2001 |
| DE | 299 23 577 | 1/2001 |
| DE | 19944564 | 3/2001 |
| DE | 100 50 367 A1 | 5/2001 |
| DE | 100 00 702 A1 | 7/2001 |
| DE | 100 30 586.5 | 1/2002 |
| DE | 100 34 466 A1 | 1/2002 |
| DE | 100 49 334 A1 | 2/2002 |
| DE | 101 30 063 A1 | 3/2002 |
| DE | 100 59 975 A1 | 6/2002 |
| DE | 696 18 226 | 8/2002 |
| DE | 102 09 097 A1 | 9/2002 |
| DE | 101 18 035 A1 | 11/2002 |
| DE | 101 31 266 A1 | 1/2003 |
| DE | 101 61 452 A1 | 2/2003 |
| DE | 10161452 | 2/2003 |
| DE | 100 41 631 A1 | 3/2003 |
| DE | 101 31 220 | 3/2003 |
| DE | 102 38 533 A1 | 4/2003 |
| DE | 102 48 128 A1 | 4/2003 |
| DE | 101 61 615 A1 | 6/2003 |
| DE | 10161616 | 6/2003 |
| DE | 101 62 102.7 | 7/2003 |
| DE | 102 31 249 A1 | 2/2004 |
| DE | 102 48 924 A1 | 4/2004 |
| DE | 102 48 921 A1 | 5/2004 |
| EP | 0 010 979 | 5/1980 |
| EP | 0 042 655 A1 | 12/1981 |
| EP | 0 043 460 | 1/1982 |
| EP | 0 133 645 | 3/1985 |
| EP | 0 174 382 B1 | 3/1986 |
| EP | 0 235 598 B1 | 9/1987 |
| EP | 0 252 552 A1 | 1/1988 |
| EP | 0 334 864 | 6/1988 |
| EP | 0298236 A | 1/1989 |
| EP | 0 301 269 B1 | 2/1989 |
| EP | 0 339 027 B1 | 11/1989 |
| EP | 0 391 937 B1 | 10/1990 |
| EP | 0 408 986 B1 | 1/1991 |
| EP | 0 408 987 B1 | 1/1991 |
| EP | 0 412 439 A2 | 2/1991 |
| EP | 0 458 080 B1 | 4/1991 |
| EP | 0 458 190 B1 | 11/1991 |
| EP | 0 472 548 B1 | 3/1992 |
| EP | 0 548 169 | 3/1992 |
| EP | 0 501 839 A2 | 9/1992 |
| EP | 0 513 003 B1 | 11/1992 |
| EP | 0 515 230 B1 | 11/1992 |
| EP | 0 521 259 B1 | 1/1993 |
| EP | 0 537 700 A1 | 4/1993 |
| EP | 0 542 693 A1 | 5/1993 |
| EP | 0 575 763 B1 | 12/1993 |
| EP | 0 591 875 | 4/1994 |
| EP | 0 591 876 | 4/1994 |
| EP | 0 604 477 B1 | 7/1994 |
| EP | 0 650 805 B1 | 5/1995 |
| EP | 0 656 641 B1 | 6/1995 |
| EP | 0 691 181 B1 | 1/1996 |
| EP | 0 732 174 | 9/1996 |
| EP | 0 734 116 | 9/1996 |
| EP | 0 760 063 B1 | 3/1997 |
| EP | 0 780 031 | 6/1997 |
| EP | 0 802 552 B1 | 10/1997 |
| EP | 0 806 268 B1 | 11/1997 |
| EP | 0 808 011 | 11/1997 |
| EP | 0 857 266 | 8/1998 |
| EP | 0 868 265 B1 | 10/1998 |
| EP | 0 942 802 B1 | 9/1999 |
| EP | 1 008 229 B1 | 6/2000 |
| EP | 1 024 582 A2 | 8/2000 |
| EP | 1 077 106 A2 | 2/2001 |
| EP | 1 132 180 A2 | 9/2001 |
| EP | 1 168 390 A1 | 1/2002 |
| EP | 1 173 869 B1 | 1/2002 |
| EP | 1 174 537 A2 | 1/2002 |
| EP | 1 293 296 A2 | 3/2002 |
| EP | 1 217 237 A1 | 6/2002 |
| EP | 1 260 322 A1 | 11/2002 |
| EP | 1 327 497 A2 | 7/2003 |
| EP | 1 489 727 A1 | 6/2004 |
| EP | 1449618 | 8/2004 |
| EP | 1470882 | 10/2004 |
| FR | 1500685 | 11/1967 |
| FR | 2514550 A | 4/1983 |
| FR | 2 771 787 | 6/1999 |
| GB | 2018045 A | 10/1979 |
| GB | 2 304 407 | 3/1997 |
| GB | 2 319 974 A | 6/1998 |
| GB | 2 390 562 A | 1/2004 |
| JP | 60-152247 | 8/1985 |
| JP | 2-17961 | 2/1990 |
| JP | 3-230736 | 10/1991 |
| JP | 6238557 | 8/1994 |
| WO | WO 82/00353 | 2/1982 |
| WO | WO 92/04549 | 3/1992 |
| WO | WO 93/04835 | 3/1993 |
| WO | WO 94/07041 | 3/1994 |
| WO | WO 95/00288 | 1/1995 |
| WO | WO 97/07347 | 2/1997 |
| WO | WO 98/01733 | 1/1998 |
| WO | WO 98/09096 | 3/1998 |
| WO | WO 99/56024 | 11/1999 |
| WO | WO 01/51251 A1 | 7/2001 |
| WO | WO 01/66314 | 9/2001 |
| WO | WO 02/08636 | 1/2002 |
| WO | WO 02/054972 | 7/2002 |
| WO | WO 03/004217 A1 | 1/2003 |
| WO | WO 03/004218 A1 | 1/2003 |
| WO | WO 03/095862 A1 | 11/2003 |
| WO | WO 2004/077646 A1 | 9/2004 |

\* cited by examiner

PADDLE SWITCH

FIELD

The present disclosure relates to various features of a handheld grinder or similar power tool having a brushless electric motor.

BACKGROUND

Some power tools include brushless electric motors. Power tools with brushless electric motors are used for woodworking and metalworking, for example. Such power tools include a power switching circuit that delivers power from a power supply to the motor, and a controller that manages the switching operation of the power switching circuit to control a speed of the motor.

Conventional power tools also often include a power on/off switch disposed on the current path from the power supply to either the power switching circuit or the motor. Such switches are mechanically actuated by the user via, e.g., a trigger switch in drills or impact drivers, or a paddle switch or sliding switch in tools such as grinders. These switches actuate the power switch to make or break contact on the current path supplied to the motor.

As the power tool shave become more compact and innovative, smaller power switches have been utilized. Such switches may be disposed on current paths to, for example, a controller that controls the switching operation of the power switching circuit, or another associated circuit component, and thus are rated to carry a smaller amount of current. The mechanically-actuated trigger, paddle, or sliding switches should be made to work with such on/off switches.

This section provides background information related to the present disclosure and is not necessarily prior art.

SUMMARY

This section provides a general summary of the disclosure, and is not a comprehensive disclosure of its full scope or all of its features.

According to an embodiment, a power tool is provided, including a housing, a motor disposed within the housing, an on/off switch having a contact tip disposed within the housing for activating the motor, a paddle switch coupled to the housing via a pivot member and having a paddle trigger engageable by a user, a switch contact lever disposed in selectable engagement with the contact tip of the on/off switch to activate and/or deactivate the on/off switch, and a biasing member disposed between the switch contact lever and the paddle switch to absorb a travel distance of the paddle trigger with respect to the switch contact lever.

In an embodiment, the switch contact lever is coupled to the paddle switch via a second pivot member.

In an embodiment, the paddle switch includes an inner body extending into the housing from the paddle trigger, and the second pivot member is coupled to the inner body.

In an embodiment, the switch contact lever is disposed between the paddle switch and the on/off switch.

In an embodiment, the switch contact lever includes a first spring post, the paddle trigger includes a second spring post, and ends of the biasing member are disposed around the first spring post and the second spring post.

In an embodiment, the spring post is disposed to support the switch contact lever at an angular distance with respect to the paddle trigger in a default position of the paddle trigger.

In an embodiment, within a first angular travel range of the paddle trigger, the switch contact lever moves with the paddle trigger at approximately the same angular travel distance.

In an embodiment, within a second angular travel range of the paddle trigger, the switch contact lever engages and presses on the contact tip of the on/off switch to activate the on/off switch. In an embodiment, the angular travel distance of the switch contact lever is smaller than the angular travel distance of the paddle trigger within the second angular travel range of the paddle trigger.

In an embodiment, within a third angular travel range of the paddle trigger, the switch contact lever remains substantially in place in engagement with the contact tip of the on/off switch.

In an embodiment, the total angular travel range of the paddle trigger is in the range of 10-20 degrees.

In an embodiment, the first angular travel range of the paddle trigger is approximately 30-40% of the total angular travel range of the paddle trigger, the second angular travel range of the paddle trigger is approximately 20-30% of the total angular travel range of the paddle trigger, and the third angular travel range of the paddle trigger is approximately 30-40% of the total angular travel range of the paddle trigger.

In an embodiment, the power tool further includes a paddle force lever disposed between the paddle switch and a portion of the housing to apply a biasing force on the paddle switch away from the housing. In an embodiment, the paddle force lever is coupled to the paddle switch via a second pivot member.

In an embodiment, the power tool further includes a leg extending from the switch contact lever opposite the second pivot member, and the paddle switch engages the leg to rotate the switch contact lever away from the on/off switch when the paddle trigger is released.

In an embodiment, the paddle switch includes an engagement post projecting from an inner face of the paddle trigger that engages the leg when the paddle trigger is released.

In an embodiment, the housing includes an elongated housing arranged to receive a planar circuit board therein, and at least one cover that mates with the elongated housing around the planar circuit board.

In an embodiment, the pivot member is disposed to connect the paddle switch to the cover.

In an embodiment, the on/off switch is an analog logic switch capable of carrying voltage of up to 20 volts.

In an embodiment, the power tool includes a switching arrangement between a power supply and the motor, a controller configured to control a switching operation of the switching arrangement circuit to control an operation of the motor, a driver circuit disposed between the controller and the switching arrangement to provide voltage signals for controlling the switching operation of the switching arrangement, and a power supply regulator for supplying a voltage input to at least one of the driver circuit or the controller.

In an embodiment, the on/off switch is disposed on a path of the voltage input between the power supply regulator and at least one of the driver circuit or the controller.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 3:
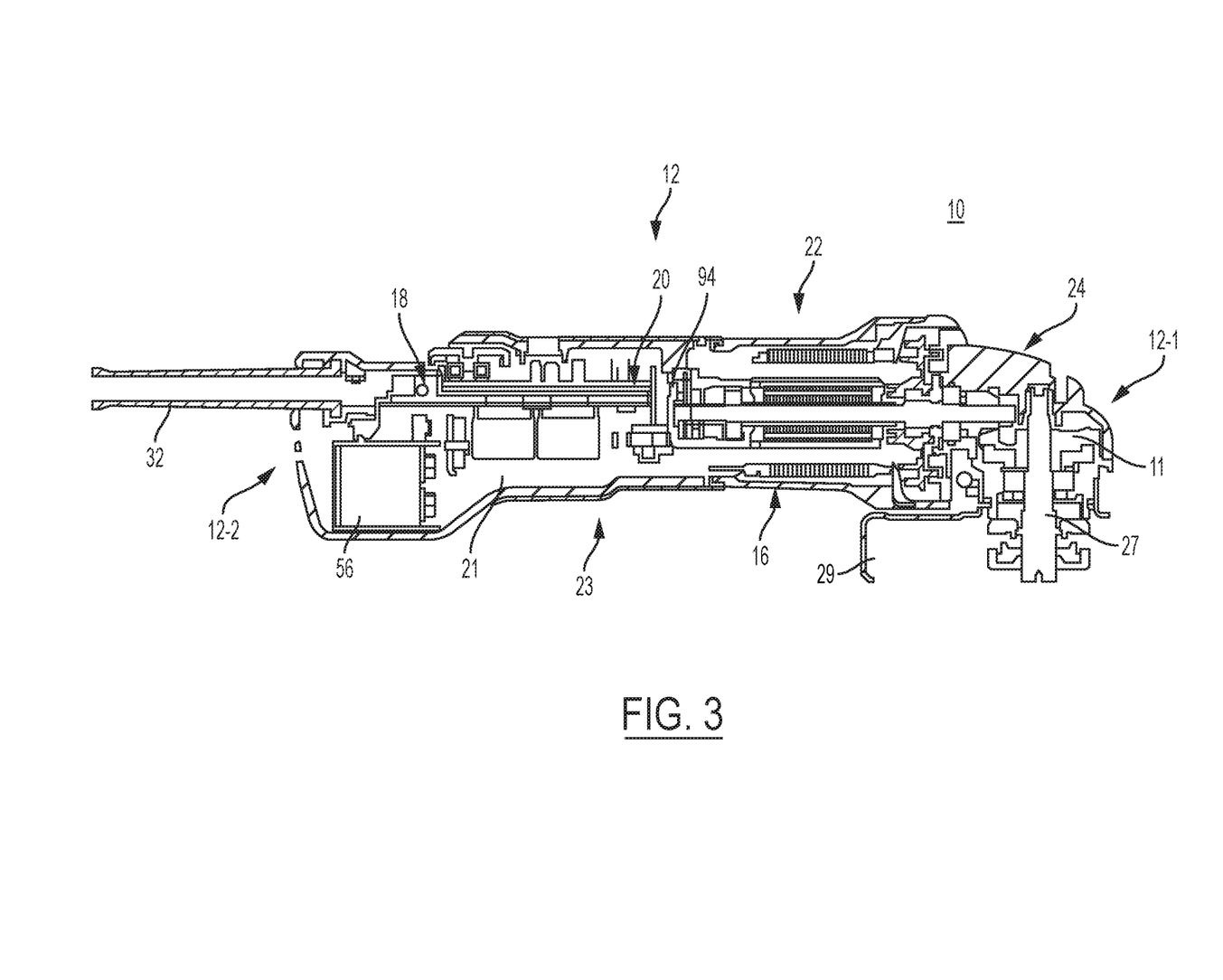
FIG. 3 is a cross-sectional side view of an example embodiment of the power tool.

Referring to FIGS. 1, 2A, 2B, and 3, a power tool 10 is shown. In this example embodiment, the power tool 10 includes an elongated housing 12, a motor 16 (FIG. 3), a module casing or power module support structure 18 (FIG. 3), and a planar circuit board 20 (FIG. 3).

The housing 12 defines a cavity 21 (FIG. 3) and includes a motor case 22 and a handle portion 23. The motor case 22 is positioned at one end 12-1 of the housing 12 and includes a gear case 24 and a sliding switch 25. The gear case 24 includes a gearset 11, an output shaft 27, and a threaded opening 28. The gearset 11 is positioned within the gear case 24 and is drivably coupled to the motor 16. The output shaft 27 is drivably connected to the gearset 11 within the gear case 24 and extends perpendicular to the longitudinal axis of the housing 12. The output shaft 27 is also coupled to a grinding or a cutting disc (not shown) via a flange (not shown). The grinding disk may be removed and replaced with a new grinding disk. For example, a user of the power tool 10 may replace the existing grinding disk with a new grinding disk after the existing disk wears out. An adjustable guard 29 may cover at least a portion of the rotating disk to obstruct sparks and debris generated during operation of the power tool 10. The threaded opening 28 allows for selectively attaching a side-handle (not shown) to enable two-handed operation. The sliding switch 25 is positioned on a side of the motor case 22 and engages a power on/off switch 24 (described below) to allow for the user to turn the power tool 10 ON and OFF.

The handle portion 23 extends axially from the motor case 22 toward a second end 12-2 of the housing 12 and includes a first cover 23a and a second cover 23b. The first and the second covers 23a, 23b are secured together around the module casing 18 and the planar circuit board 20 disposed within the cavity 21 of the handle portion 23. The second cover 23b includes a support member 30 protruding outwardly therefrom and positioned at the second end 12-2 of the housing 12. The support member 30 includes openings 31 extending therethrough to allow incoming air to enter the cavity 21. An AC power cord 32 is attached to the handle portion 23 at the second end 12-2 of the housing 12 to supply electric power to the power tool 10.

While the present description is provided with reference to a grinder, it is readily understood that the broader aspects of the present disclosure are applicable to other types of power tools, including but not limited to sander, drill, impact driver, tapper, fastener driver, and saw. For example, the power tool 10 may include a chuck that is configured to receive a drill bit or a screw bit, thereby allowing the power tool 10 to be used as a power drill or a power screw driver.

Figure 4:
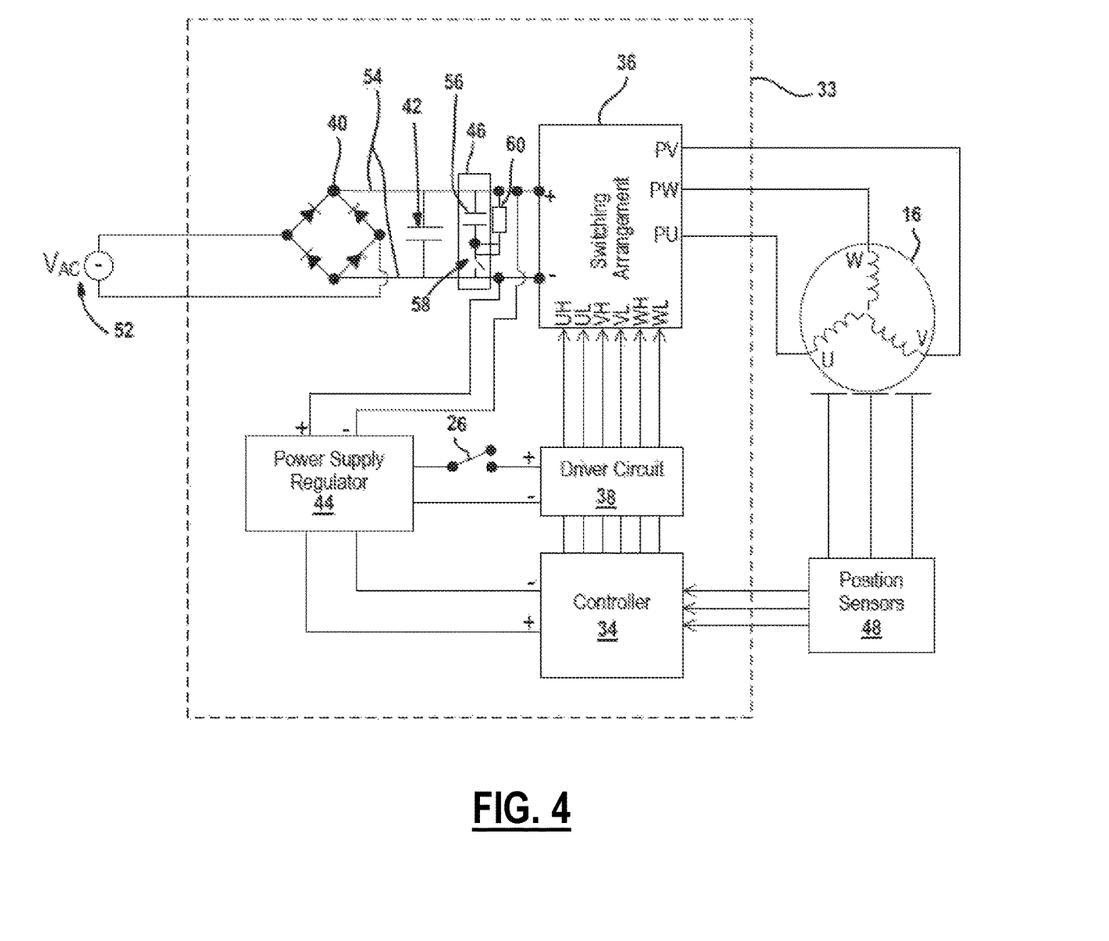
FIG. 4 is a schematic circuit diagram of an example motor control system for the power tool.

FIG. 4 depicts a schematic that illustrates an example of a motor drive circuit 33. Many components included in the motor drive circuit 33 may be integrated on the planar circuit board 20 disposed entirely within the cavity 21 of the handle portion 23. The motor drive circuit 33 is comprised generally of a controller 34, a switching arrangement 36, a driver circuit 38, a rectifier 40, a DC bus capacitor 42, a power supply 44, and an auxiliary switch path 46. The motor drive circuit 33 may further include positioned sensors 48, such as Hall Effect sensors that are configured to detect rotational motion of the motor 16 and generate a signal indicative of the rotational motion. The signal may have a periodic waveform whose magnitude may vary in accordance with the rotational position of the motor 16. It should be noted, that other types of positional sensors may be alternatively utilized and should not be limited to Hall Effect sensors.

An AC supply 52 delivers an alternating current to the rectifier 40 through, for example, the power cord 32. The rectifier 40 converts the alternating current into a direct current that is outputted to a DC bus 54 (i.e., power line/bus). The output of the rectifier 40 may be pulsating DC signal and not a pure DC signal.

The DC bus capacitor 42 is electrically connected in parallel with the rectifier 40. The switching arrangement 36 is electrically connected with the DC bus capacitor 42 and may receive the pure DC signal or the substantially pure DC signal from the DC bus capacitor 42 via the DC bus 54. The switching arrangement 36 includes a plurality of motor switches that, when switched on, deliver the DC current to the motor 16 on phase voltage lines 55 (PV, PW, PU). The motor switches may be IGBTs or FETs, for example. The switching arrangement 36 may be further defined as a three-phase inverter bridge although other arrangements are contemplated by this disclosure.

The DC bus capacitor 42 may be a link capacitor having relatively small capacitance and does not act to smoothen the full-wave rectified AC voltage. The DC bus capacitor 42 is a bypass capacitor that removes the high frequency noise from the bus voltage.

The auxiliary switch path 46 is electrically coupled in parallel with the rectifier 40 and the link capacitor 42, and is electrically connected between the rectifier 40 and the switching arrangement 36. The auxiliary switch path 46 includes an auxiliary capacitor 56 and a switch 58 positioned in series with the auxiliary capacitor 56.

The switch 58 may be a controlled switch, such as a MOSFET or an IGBT, in an embodiment. The switch 58 may be controlled by software programmed into the controller 34 or another programmable microcontroller. Alternatively, the switch 58 may be controlled by hardware, such as a switch control circuit 60, described in detail below. When the switch 58 is closed, the auxiliary capacitor 56 is connected parallel to the DC bus capacitor 42.

The driver circuit 38 interfaces with the motor switches of the switching arrangement 36. The driver circuit 38 controls the state of the motor switches. In the example embodiment, the driver circuit 38 is shown as being separate from the switching arrangement 36. Alternatively, the driver circuit 38 and the switching arrangement 36 may be a single integrated circuit which may be commercially available from various manufacturers. For example, the switching arrangement 36, which may include IGBTs, and the driver circuit 38 may be a part of an integrated power module.

The controller 34 interfaces with the driver circuit 38 and may generate PWM signals to control the motor 16. In this embodiment, the controller 34 receives power from the power supply regulator 44. In an alternate embodiment, the controller 34 may receive power directly from the rectifier 40.

The power supply regulator 44 is electrically connected in parallel with the rectifier 40 and operates to power the driver circuit 38 via a power on/off switch 26. The power on/off switch 26 is positioned between the power supply regulator 44 and the driver circuit 38. In an embodiment, the power on/off switch 26 is an analog logic switch capable of carrying a voltage of up to 20V from the power supply regulator 44 to the gate driver circuit 38. The power on/off switch 26 may be a current-carrying power switch activated via a normally-open contact member. When the contact member is pressed down, the power on/off switch switches to the ON-position.

When the power on/off switch 26 is switched to the ON-position, the driver circuit 38 receives power from the power supply regulator 44. When the driver circuit 38 receives power, the driver circuit 38 is able to control the state of the motor switches 55 and the motor 16 is on.

Conversely, when the power on/off switch 26 is switched to the OFF-position, the driver circuit 38 does not receive power from the power supply regulator 44. When the driver circuit 38 does not receive power, the driver circuit 38 is not able to control the state of the motor switches 55 and the electric motor is off.

As illustrated, the power on/off switch 26 is electrically connected between the rectifier 40 and the driver circuit 38. The power on/off switch 26 is positioned such that the power from the AC power supply 52 does not pass through the power on/off switch 26. Furthermore, the current being drawn by the motor 16 does not pass through the power on/off switch 26. The current passing through the power on/off switch 26 is the current being drawn by the driver circuit 38 and the current being drawn by the driver circuit 38 is lower than the current being drawn by the electric motor 16.

Figure 1:
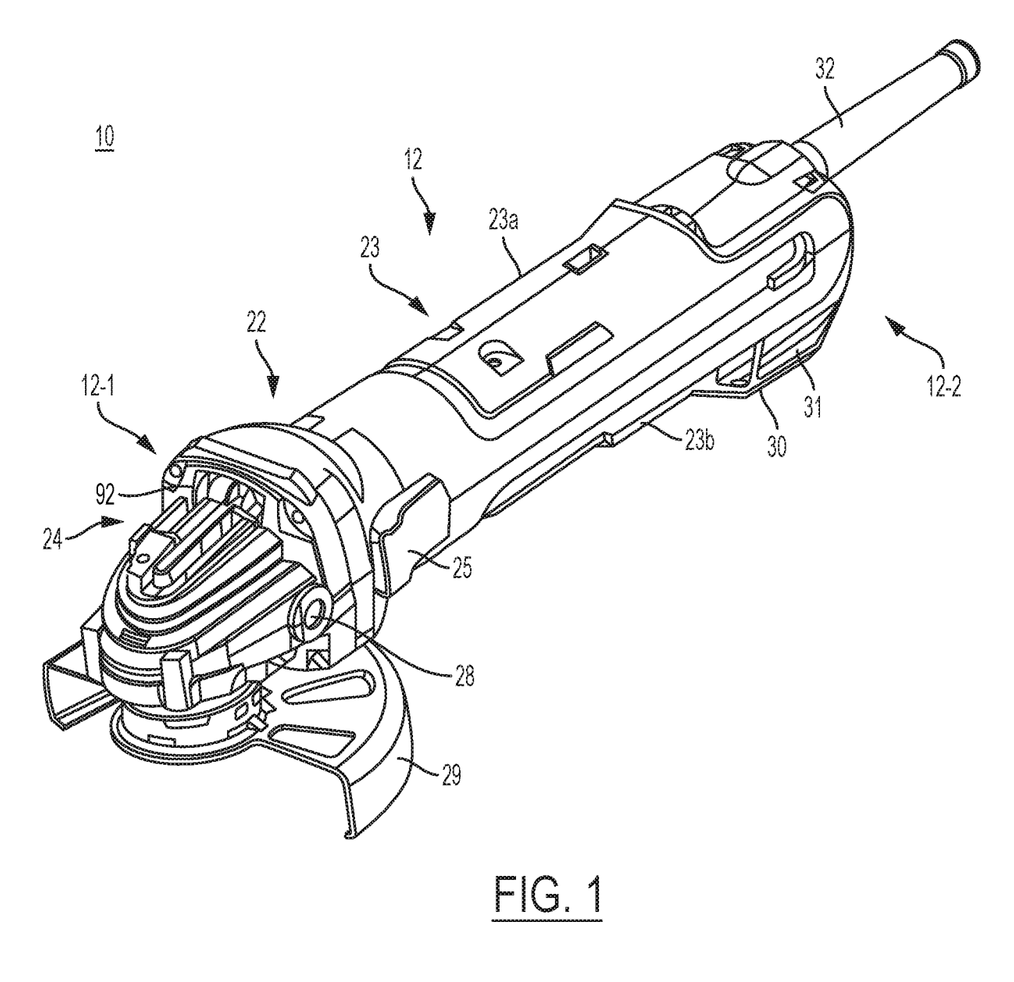
FIG. 1 is a perspective view of a power tool.
Figure 2A:
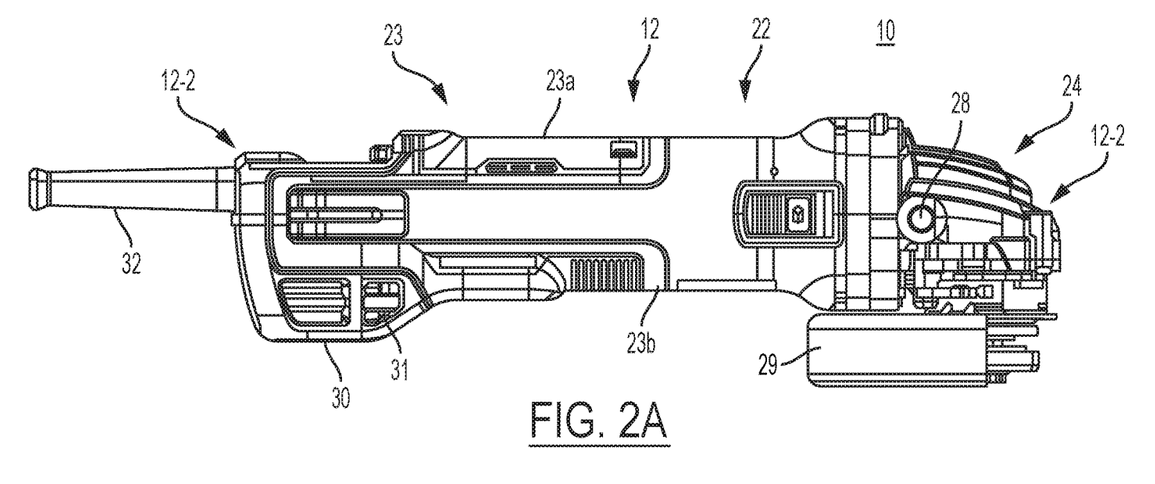
FIGS. 2A and 2B are side views of the power tool with a bottom handle cover attached and removed, respectively.
Figure 2B:
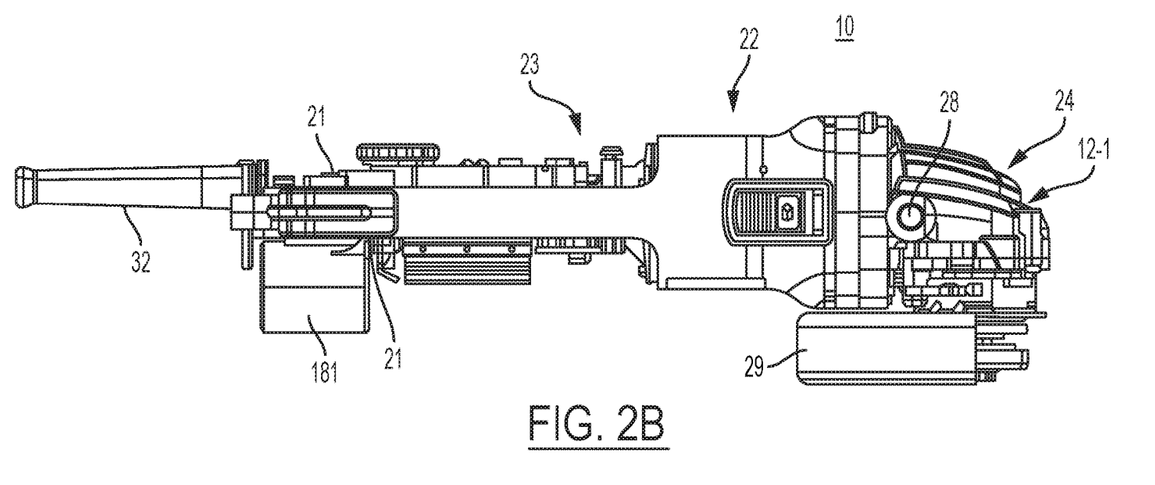
Figure 5:
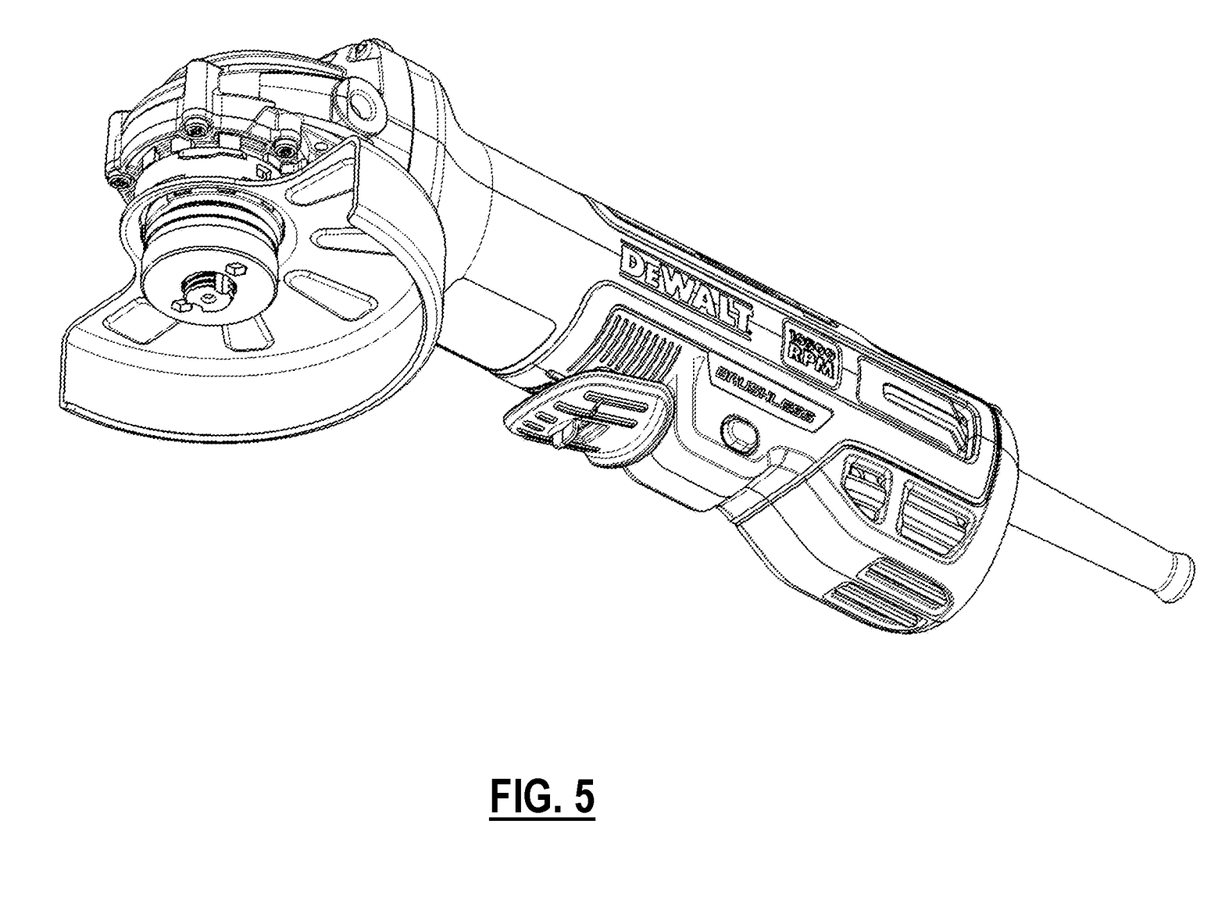
FIG. 5 is a perspective view of the example embodiment of the power tool having a paddle trigger switch.
Figure 6:
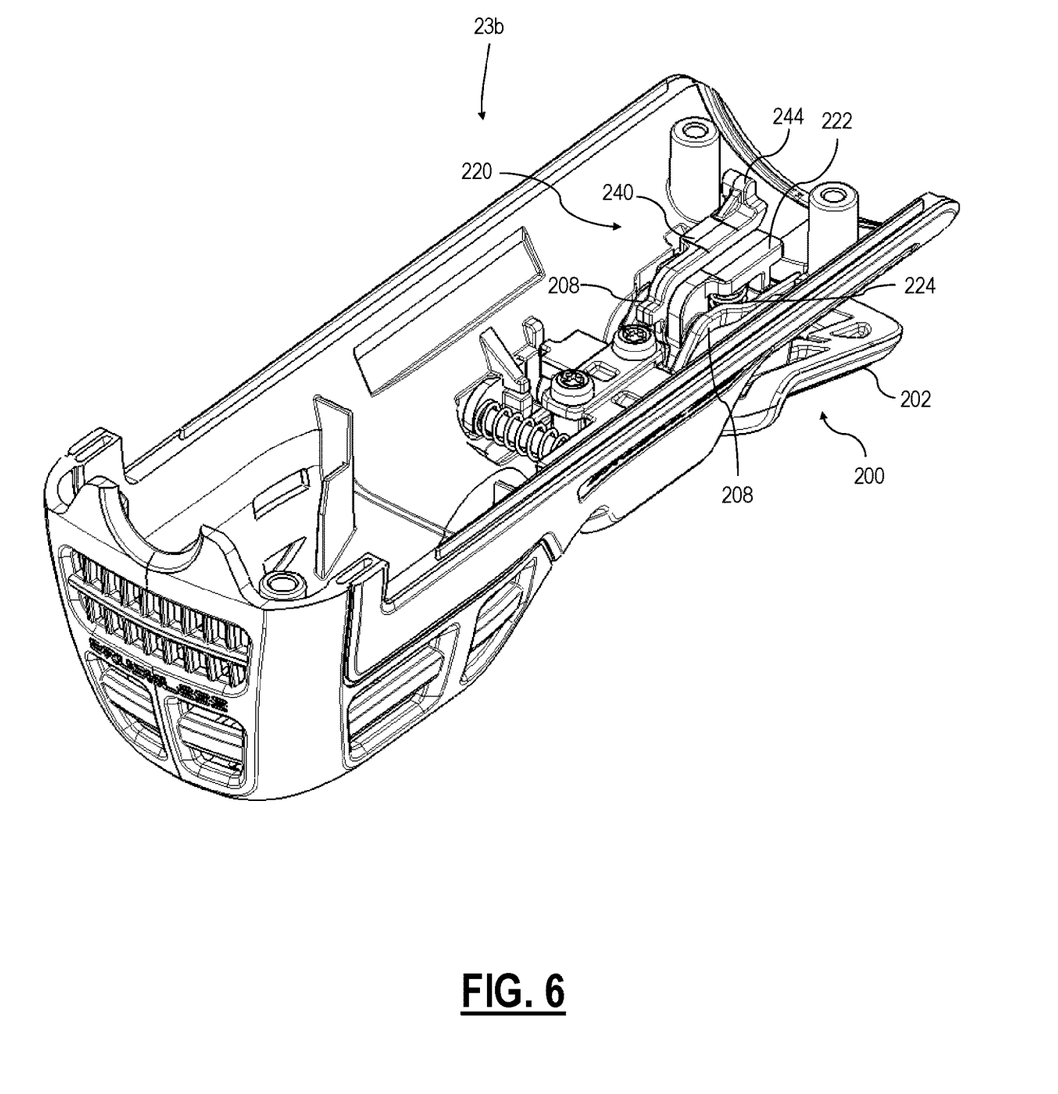
FIGS. 6 and 7 depict inner perspective views of a cover including the paddle trigger switch attached thereto.
Figure 7:
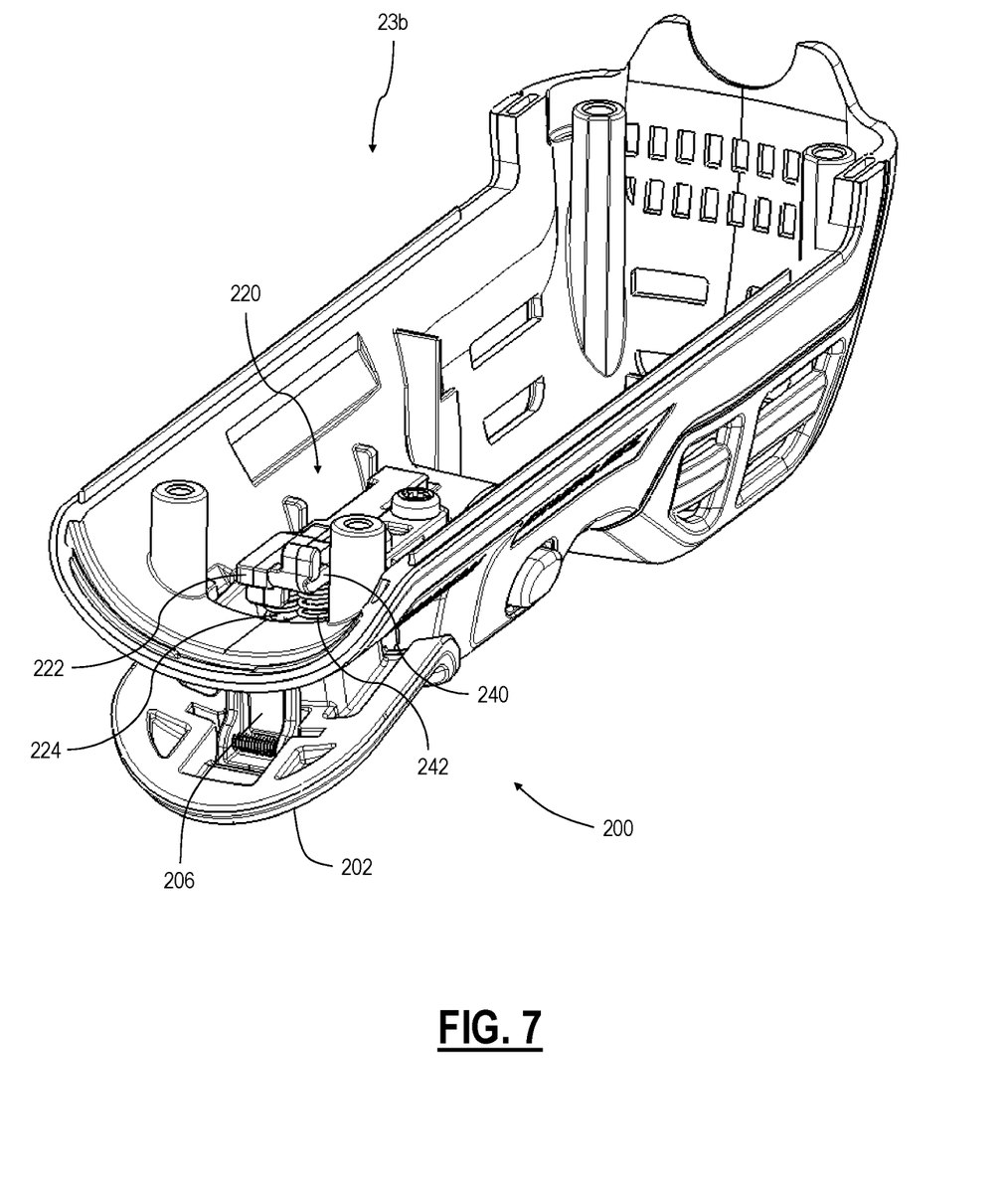

The power on/off switch 26 may be engaged via a sliding switch 25 as shown in FIG. 1. The power on/off switch 26 may alternatively be engaged via a paddle switch 200, as shown in FIG. 5 and described below.

U.S. Pat. No. 8,087,976, contents of which are incorporated herein by reference in entirety, describes an example of a conventional sliding switch. Generally speaking, a sliding switch includes a slider button arranged outside the power tool housing that is attached to a link member disposed within the power tool housing. The actuation of the sliding switch by the user causes the link member to make or break contact with the power on/off switch to turn the power tool on or off.

The '976 patent also described an example of a conventional paddle switch. Generally speaking, a paddle switch includes a paddle trigger that pivots around a pivot post, and an arm that extends from the paddle switch across the pivot posts. The actuation of the paddle trigger causes the arm the make or break contact with the power on/off switch to turn the tool on or off.

Such conventional sliding switches and paddle switch are suitable for engaging conventional on/off power switches that are disposed on the current path from the power supply.

Such power switches tend to be relatively large, with a contact portion that has a travel distance of, for example, 4 to 8 mm. For example, the contact portion of on/off switch 24 in FIG. 5 of the '976 patent can turn on after the face 56 of the paddle switch travels 2-3 mm, but can absorb another 4 mm of travel distance by face 56. Such power switches provide some degree of flexibility for the travel distance of the slider button (for a sliding switch) or the paddle trigger (for a paddle switch).

According to an embodiment, as described above, the power on/off switch 26 is an analog logic switch capable of carrying a voltage of up to 20V from the power supply regulator 44 to the gate driver circuit 38. Thus, the power on/off switch 26 may be much smaller in size than conventional high-current power switches, and as such, may be provided with a contact portion that can absorb a significantly smaller travel distance. In an embodiment, the contact portion of the power on/off switch 26 may only have a total travel distance of less than 1 mm.

In an embodiment, where power tool 10 is provided with a sliding switch 25, as shown in FIG. 1, the sliding switch 25 may be coupled to a link member (not shown) that is made of flexible material capable of absorbing extra the travel distance of the sliding switch 25. Specifically, the contact face of the link member may be bendable to absorb the travel distance of the sliding switch of up to 10 mm. In this manner, if the contact face of the link member comes into contact with the contact portion of the on/off switch 26 after, for example, 5 mm of the sliding switch 25 travel, and turns ON the on/off switch after, for example, 6 mm of sliding switch 25 travel, it bends to absorb the remaining travel distance of the sliding switch 25 without damaging the on/off switch 26. In this manner, the on/off switch turns ON approximately half-way within the travel distance of the sliding switch 25.

Figure 8:
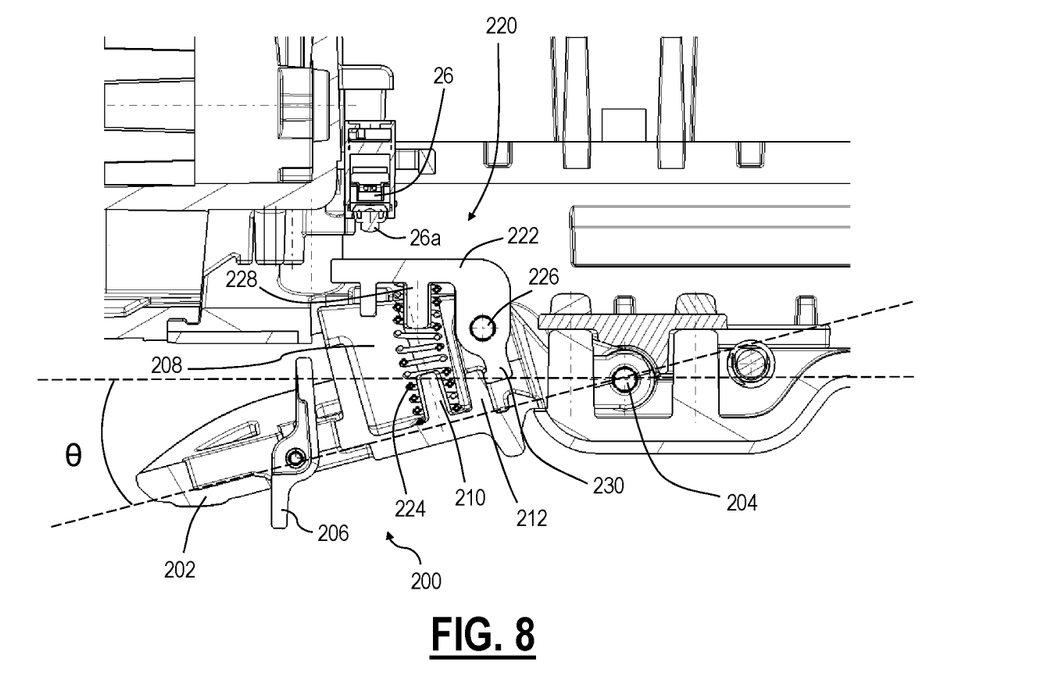
FIGS. 8 and 9 depicts cross-sectional views of the power tool including the paddle switch and an associated actuation assembly.
Figure 9:
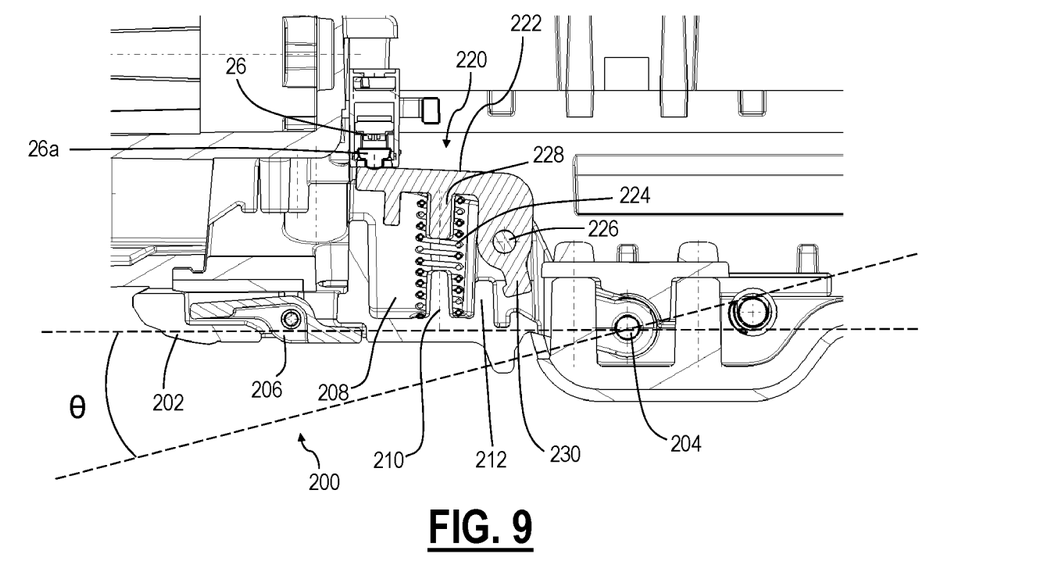

In an embodiment, where power tool 10 is provided with a paddle switch 200, as shown in FIG. 5, the paddle switch 200 may be coupled to an actuation assembly 220, as described herein with reference to FIGS. 6-9. In an embodiment, paddle switch 200 may be incorporated into handle cover 23b, as shown in FIG. 5 and the perspective inner views of FIGS. 6 and 7. FIGS. 8 and 9 depicts cross-sectional views of the power tool 10 including the paddle switch 200 and the actuation assembly 220.

In an embodiment, the paddle switch 200 includes a paddle trigger 202 connected to the handle cover 23b (or another part of the power tool housing 12) via a pivot member 204. The paddle trigger 202 may include a trigger lock 206 pivotably extending from the paddle trigger 202 and is spring-loaded to a locked position (FIG. 8), in which it prevents the paddle trigger 202 from being pressed by the user from its default position. The trigger lock 206 is engaged by the user and rotated with respect to the paddle trigger 202 to an unlocked position (FIG. 9) before the paddle trigger 202 can be fully pressed by the user to activate the power tool 10. When the paddle trigger 202 is released, the trigger lock 206 springs back into its locked position, and as it slides against the handle cover 23b, it forces the paddle trigger 202 away from the handle cover 23b to its default position.

In an embodiment, the actuation assembly 220 includes a switch contact lever 222 arranged to engage a contact tip 26a of the on/off switch 26. The switch contact lever 222 is positioned between the paddle trigger 202 and the on/off switch 26. A biasing member 224, such as a compression spring, is disposed between the paddle trigger 202 and the switch contact lever 222. Switch contact lever 222 is rotatable around a pivot member 226. In an embodiment, pivot member 226 pivotably connects the switch contact lever 222 to an inner body portion 208 of the paddle switch 200 that extends into the cover 23b from the paddle trigger 202. Alternatively, the pivot member 226 may pivotably connect the switch contact lever 222 to an inner wall of the handle cover 23b or another part of the power tool housing 12. In an embodiment the pivot member 226 may be the same (i.e., along the same axis) as the pivot member 204. Alternatively, pivot members 204 and 226 may be disposed along two different axes.

In an embodiment, the actuation assembly 220 includes a spring post 210 disposed on an inner face of the paddle trigger 202 within the inner body portion 208. The switch contact lever 222 similarly includes a spring post 228 facing spring post 210 of the actuation assembly 200. The biasing member 224 is disposed around the spring posts 210 and 228 so as to biasedly locate the switch contact lever 222 at an angular distance with respect to the paddle trigger 202. Disposition of the biasing member 224 between the paddle trigger 202 and the switch contact lever 222 allows the switch contact lever 222 to move with the actuation of the paddle trigger 202 until the switch contact lever 222 comes into contact with the contact tip 26a of on/off switch 26 and turns on the on/off switch 26, without damaging the on/off switch 26 with further travel of the paddle trigger 202. This is discussed below in detail.

In an embodiment, the actuation assembly 220 also includes a paddle force lever 240 disposed adjacent the switch contact lever 222. The paddle force lever 240 may be coupled to inner body portion 208 of the paddle switch 200 via pivot member 226. Alternatively, paddle force lever 240 may be coupled to the paddle switch 220 via a separate pivot member. The paddle force lever 240 is spring-loaded with respect to the paddle trigger 202 via a biasing member 242. A tip 244 of the paddle force lever 240 engages a portion of the housing 12 (e.g., an outer wall of the motor case 22), exerting a biasing force on the paddle trigger 202 away from the housing 12 to return the paddle switch 200 to its default position when it is released by the user.

In an embodiment, extending from the switch contact lever 222, opposite the pivot member 226, is disposed a leg 230 extending downwardly towards the paddle switch 200. The paddle switch 200 includes a corresponding engagement post 212 projecting from an inner face of the paddle trigger 202 adjacent the spring post 210 proximate the leg 230. When the paddle switch 200 is released, the engagement post 212 engages the leg 230 so as to rotate the switch contact lever 222 away from the on/off switch 26. The engagement post 212 does not engage the leg 230 when the paddle switch 200 is pressed.

During operation, when the paddle switch 200 is pressed by the user, the paddle trigger 202 is rotated about the pivot member 204. The total angular travel range 8 of the paddle trigger 202 may be, in an embodiment, approximately 10-20 degrees, and in an example, approximately 15 degrees. Within a first angular travel range of the paddle trigger 202 (e.g., 0 to 6 degrees), the switch contact lever 222 moves freely (at approximately the same angular travel distance) with the paddle trigger 202 until it comes into contact with the on/off switch 26. Within a second angular travel range of the paddle trigger 202 (e.g., between 6 to 10 degrees), the switch contact lever 222 engages and presses on the contact tip 26a of the on/off switch 26 to turn it on. The compression force of the biasing member 224 is sufficient to allow the switch contact lever 222 to actuate the contact tip 26a of the on/off switch 26, but may absorb some of the impact. In an embodiment, the angular travel distance of the switch contact lever 222 is smaller than the angular travel distance of the paddle trigger 202 within the second angular travel range. Thereafter, within a third angular travel range of the paddle trigger 202 (e.g., 10 to 15 degrees), the switch contact lever 222 remains substantially in place in contact with the on/off switch 26 while the biasing member 224 absorbs the over-travel distance of the paddle trigger 202. The biasing fore of the spring is overcome by the on/off switch 26 within the third angular travel range so the switch contact lever 222 does not damage the on/off switch 26. With this arrangement, the on/off switch 26 turns on within approximately 40-70% of the travel distance of the paddle trigger 202 and the biasing member 224 absorbs the remaining travel distance of the paddle trigger 202 to prevent damage to the on/off switch 26.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A power tool comprising:
   a housing;
   a motor disposed within the housing;
   an on/off switch having a contact tip disposed within the housing for activating the motor;
   a paddle switch coupled to the housing via a first pivot member and having a paddle trigger extending from the first pivot member and being engageable by a user, wherein the first pivot member is not displaceable relative to the on/off switch with actuation of the paddle switch;
   a switch contact lever coupled to the paddle switch via a second pivot member and disposed at least partially between the paddle switch and the on/off switch in selectable engagement with the contact tip of the on/off switch to activate or deactivate the on/off switch, wherein the second pivot member is displaceable relative to the on/off switch with actuation of the paddle switch; and
   a biasing member disposed between the switch contact lever and the paddle switch to absorb a travel distance of the paddle trigger with respect to the switch contact lever.

2. The power tool of claim 1, wherein the paddle switch comprises an inner body extending into the housing from the paddle trigger, and the second pivot member is coupled to the inner body.

3. The power tool of claim 1, wherein the switch contact lever is disposed between the paddle switch and the on/off switch.

4. The power tool of claim 1, wherein the switch contact lever includes a first spring post, the paddle trigger includes a second spring post, and ends of the biasing member are disposed around the first spring post and the second spring post.

5. The power tool of claim 1, wherein the biasing member is disposed to support the switch contact lever at an angular distance with respect to the paddle trigger in a default position of the paddle trigger.

6. The power tool of claim 1, wherein, within a first angular travel range of the paddle trigger, the switch contact lever moves with the paddle trigger.

7. The power tool of claim 6, wherein, within a second angular travel range of the paddle trigger, the switch contact lever engages and presses on the contact tip of the on/off switch to activate the on/off switch.

8. The power tool of claim 7, wherein an angular travel distance of the switch contact lever is smaller than an angular travel distance of the paddle trigger within the second angular travel range of the paddle trigger.

9. The power tool of claim 6, wherein, within a third angular travel range of the paddle trigger, the switch contact lever remains substantially in place in engagement with the contact tip of the on/off switch.

10. The power tool of claim 9, wherein the total angular travel range of the paddle trigger is in the range of 10-20 degrees.

11. The power tool of claim 9, wherein the first angular travel range of the paddle trigger is approximately 30-40% of the total angular travel range of the paddle trigger, the second angular travel range of the paddle trigger is approximately 20-30% of the total angular travel range of the paddle trigger, and the third angular travel range of the paddle trigger is approximately 30-40% of the total angular travel range of the paddle trigger.

12. The power tool of claim 1, further comprising a paddle force lever disposed between the paddle switch and a portion of the housing to apply a biasing force on the paddle switch away from the housing.

13. The power tool of claim 12, wherein the paddle force lever is coupled to the paddle switch via the second pivot member.

14. The power tool of claim 1, further comprising a leg extending from the switch contact lever opposite the second pivot member, and the paddle switch engages the leg to rotate the switch contact lever away from the on/off switch when the paddle trigger is released.

15. The power tool of claim 14, wherein the paddle switch comprises an engagement post projecting from an inner face of the paddle trigger that engages the leg when the paddle trigger is released.

16. The power tool of claim 1, wherein the housing comprises an elongated housing arranged to receive a planar circuit board therein, and at least one cover that mates with the elongated housing around the planar circuit board.

17. The power tool of claim 16, wherein the first pivot member is disposed to connect the paddle switch to the cover.

18. The power tool of claim 1, wherein the on/off switch is an analog logic switch capable of carrying voltage of up to 20 volts.

19. The power tool of claim 1, further comprising:
   a switching arrangement circuit between a power supply and the motor;
   a controller configured to control a switching operation of the switching arrangement circuit to control an operation of the motor;
   a driver circuit disposed between the controller and the switching arrangement circuit to provide voltage signals for controlling the switching operation of the switching arrangement; and
   a power supply regulator for supplying a voltage input to at least one of the driver circuit or the controller.

20. A power tool comprising:
   a housing;
   a motor disposed within the housing;
   an on/off switch having a contact tip disposed within the housing for activating the motor;
   a paddle switch coupled to the housing via a first pivot member and having a paddle trigger engageable by a user;
   a switch contact lever coupled to the paddle switch via a second pivot member and disposed in selectable engagement with the contact tip of the on/off switch to activate or deactivate the on/off switch;

a biasing member disposed between the switch contact lever and the paddle switch to absorb a travel distance of the paddle trigger with respect to the switch contact lever; and a leg extending from the switch contact lever opposite the second pivot member, wherein the paddle switch engages the leg to rotate the switch contact lever away from the on/off switch when the paddle trigger is released, and wherein the paddle switch comprises an engagement post projecting from an inner face of the paddle trigger that engages the leg when the paddle trigger is released.

* * * * *